US011075376B1

(12) United States Patent
Palaparty et al.

(10) Patent No.: US 11,075,376 B1
(45) Date of Patent: Jul. 27, 2021

(54) AMORPHOUS SILICON-CARBON COMPOSITES AND IMPROVED FIRST COULOMBIC EFFICIENCY

(71) Applicant: Nanostar Inc., New Orleans, LA (US)

(72) Inventors: Sai Abhishek Palaparty, Metairie, LA (US); Jonathan Goodman, Evanston, IL (US); Shiva Adireddy, Metairie, LA (US)

(73) Assignee: Nanostar, Inc., New Orleans, LA (US)

( * ) Notice: Subject to any disclaimer, the term of this patent is extended or adjusted under 35 U.S.C. 154(b) by 0 days.

(21) Appl. No.: 17/179,810

(22) Filed: Feb. 19, 2021

Related U.S. Application Data (62) Division of application No. 16/894,209, filed on Jun. 5, 2020, now Pat. No. 10,964,935.

(60) Provisional application No. 63/016,516, filed on Apr. 28, 2020.

(51) Int. Cl.
| | |
|---|---|
| *H01M 4/00* | (2006.01) |
| *H01M 4/36* | (2006.01) |
| *H01M 4/38* | (2006.01) |
| *H01M 4/587* | (2010.01) |
| *H01M 10/0525* | (2010.01) |
| *H01M 4/02* | (2006.01) |

(52) U.S. Cl.
CPC .......... *H01M 4/364* (2013.01); *H01M 4/386* (2013.01); *H01M 4/587* (2013.01); *H01M 10/0525* (2013.01); *H01M 2004/027* (2013.01)

(58) Field of Classification Search
CPC .. H01M 4/587; H01M 10/0525; H01M 4/133; H01M 4/36; C01B 32/05; C01B 33/025
See application file for complete search history.

(56) References Cited

U.S. PATENT DOCUMENTS

| | | | |
|---|---|---|---|
| 4,154,787 A | 5/1979 | Brown | |
| 4,515,860 A | 5/1985 | Holzl | |
| 5,326,732 A | 7/1994 | Ogawa | |
| 7,776,473 B2 | 8/2010 | Aramata et al. | |
| (Continued) | | | |

OTHER PUBLICATIONS

Dhara, S, Giri, P.K., "Size Dependent Anisoptropic Strain and Optical Properties of Strained Si Nanocrystals" J. Nanosci. Nanotech. 2011, 11, 9215-9221.

(Continued)

*Primary Examiner* — Cynthia H Kelly
*Assistant Examiner* — Monique M Wills
(74) *Attorney, Agent, or Firm* — Young Basile Hanlon & MacFarlane, P.C.

(57) ABSTRACT

Compositions, anodes, and batteries are described herein and incorporate particulates that feature carbon matrices having embedded therein a plurality of amorphous silicon nanoparticles. One embodiment includes a particulate composed of a porous carbon matrix and a plurality of amorphous silicon nanoparticles affixed to an interior surface of the porous carbon matrix and adjacent to an open volume that defines specific pores. Yet another embodiment is an anode active particulate that features a plurality of amorphous silicon nanoparticles affixed to interior surfaces of a porous carbon matrix, where the anode active particulate has a "Standard-FCE" value that is about 5% greater than a "Standard-FCE" value of an analogous anode active particle having crystalline silicon nanocrystals.

13 Claims, 2 Drawing Sheets

(56) References Cited

U.S. PATENT DOCUMENTS

| | | |
|---|---|---|
| 7,906,238 B2 | 3/2011 | Le et al. |
| 8,071,238 B2 | 12/2011 | Le et al. |
| 8,889,295 B2 | 11/2014 | Yushin et al. |
| 9,178,208 B2 | 11/2015 | Park et al. |
| 9,190,186 B2 | 11/2015 | Sugiyama et al. |
| 9,397,338 B2 | 7/2016 | Park et al. |
| 9,553,303 B2 | 1/2017 | Park et al. |
| 9,570,751 B2 | 2/2017 | Cha et al. |
| 9,583,757 B2 | 2/2017 | Park et al. |
| 9,806,328 B2 | 10/2017 | Park et al. |
| 9,941,509 B2 | 4/2018 | Park et al. |
| 9,997,765 B2 | 6/2018 | Park et al. |
| 10,103,378 B2 | 10/2018 | Park et al. |
| 10,211,454 B2 | 2/2019 | Newbound et al. |
| 10,461,320 B1 | 10/2019 | Xue et al. |
| 10,461,325 B1 | 10/2019 | Xue et al. |
| 10,476,071 B2 | 11/2019 | Yushin et al. |
| 10,511,048 B2 | 12/2019 | Jo et al. |
| 10,608,240 B1 | 3/2020 | Xue et al. |
| 10,615,418 B1 | 4/2020 | Goodman et al. |
| 10,622,632 B1 | 4/2020 | Adireddy et al. |
| 10,629,898 B2 | 4/2020 | Yushin et al. |
| 2011/0051322 A1 | 3/2011 | Pushparaj et al. |
| 2011/0229761 A1 | 9/2011 | Cui et al. |
| 2013/0344391 A1 | 12/2013 | Yushin et al. |
| 2014/0079997 A1 | 3/2014 | Rosso et al. |
| 2014/0255785 A1 | 9/2014 | Do et al. |
| 2014/0264201 A1 | 9/2014 | Bouvy et al. |
| 2015/0295227 A1 | 10/2015 | Zhao et al. |
| 2015/0318571 A1 | 11/2015 | Baba et al. |
| 2015/0325848 A1 | 11/2015 | Yamashita et al. |
| 2016/0013483 A1 | 1/2016 | Loveness et al. |
| 2017/0338464 A1 | 11/2017 | Fasching et al. |
| 2017/0338481 A1 | 11/2017 | Greulich-Weber |
| 2018/0062168 A1 | 3/2018 | Gonser |
| 2018/0090755 A1 | 3/2018 | Liu et al. |
| 2018/0175390 A1 | 6/2018 | Sun et al. |
| 2018/0269480 A1* | 9/2018 | Kim .................. C01B 33/02 |
| 2019/0088939 A1 | 3/2019 | Wang et al. |

OTHER PUBLICATIONS

Huran, J. et. al. "Amorphous silicon carbide thin films deposited by plasma enhanced chemical vapor deposition at different temperature for hard environment applications" 21st International Symposium on Plasma Chemistry, 2013.

Jiang, H. et al. "The pyrolysis mechanism of phenol formaldehyde resin" Polymer Degradation and Stability 97 (2012) 1527-1533.

Mcdowell, M.T. et al. "In Situ TEM of Two-Phase Lithiation of Amorphous Silicon Nanospheres" Nano Lett. 2013, 13, 758-764.

Vertruyen, B. et al. "Spray-drying of electrode materials for lithium and sodium-ion batteries" Materials 2018, 11, 1076.

Xu, Q. et al. "Nano/Micro-Structured Si/C Anodes with High Initial Coulombic Efficiency in Li-Ion Batteries" Chem. Asian J. 2016, 11, 1205-1209.

Zhang, H.L. et al. "Urchin-like nano/micro hybrid anode materials for lithium ion battery" Carbon 44 (2006) 2778-2784.

Zhang, M. et. al. "Interweaved Si@C/CNTs&CNFs composites as anode materials for Li-ion batteries" J. Alloys and Compounds 2014, 588, 206-211.

* cited by examiner

AMORPHOUS SILICON-CARBON COMPOSITES AND IMPROVED FIRST COULOMBIC EFFICIENCY

CROSS-REFERENCE TO RELATED APPLICATIONS

This disclosure claims the benefit of priority to U.S. patent application Ser. No. 16/894,209, filed Jun. 5, 2020, and 63/016,516, filed Apr. 28, 2020, the entirety of which are incorporated herein.

FIELD OF THE INVENTION

Embodiments of the present invention relate to the anodic materials that include amorphous silicon carried in a carbon-based composite.

BACKGROUND

Lithium-ion ($Li^+$) secondary or rechargeable batteries are now the most widely used secondary battery systems for portable electronic devices. However, the growth in power and energy densities for lithium ion battery technology has stagnated in recent years as materials that exhibit both high capacities and safe, stable cycling have been slow to be developed. Much of the current research effort for the next generation of higher energy capacity materials has revolved around using small or nanoparticulate active material bound together with conductive agents and carbonaceous binders.

There is a current and growing need for higher power and energy density battery systems. The power requirements for small scale devices such as microelectromechanical systems (MEMS), small dimensional sensor systems, and integrated on-chip microelectronics exceed the power densities of current $Li^+$ based energy storage systems. Power densities of at least 1 $J/mm^2$ are desired for effective function for such systems, and current energy densities for $Li^+$ thin film battery systems are about 0.02 $J/mm^2$. Three dimensional architectures for battery design can improve the areal power density of $Li^+$ secondary batteries by packing more active material per unit area without employing thicker films that are subject to excessive cycling fatigue. Three-dimensional Lithium-ion battery architectures also increase lithium ion diffusion by maximizing the surface area to volume ratio and by reducing diffusion lengths.

The current state-of-the-art for anode electrodes in lithium ion batteries includes the use of high surface area carbon materials. However, the capacity of any graphitic carbon, carbon black, or other carbonaceous material is limited to a theoretical maximum of 372 mAh/g and about 300 mAh/g in practice because carbon electrodes are usually formed of carbon particles mixed with a polymeric binder pressed together to form a bulk electrode. To store charge, $Li^+$ intercalates between the planes of $sp^2$ carbon atoms and this C—$Li^+$—C moiety is reduced. In addition, the maximum number of $Li^+$ that can be stored is one per every six carbon atoms ($LiC_6$). While the capacity of graphitic carbon is not terribly high, the intercalation process preserves the crystal structure of the graphitic carbon, and so cycle life can be very good.

A more recent and promising option for anode materials is silicon (Si). In contrast to the intercalative charge storage observed in graphite, Si forms an alloy with lithium. Silicon-based negative electrodes are attractive because their high theoretical specific capacity of about 4200 mAh/g, which far exceeds than that of carbon, and is second only to pure Li metal. This high capacity comes from the conversion of the Si electrode to a lithium silicide which at its maximum capacity has a formula of $Li_{22}Si_6$, storing over 25 times more Li per atom than carbon. The large influx of atoms upon alloying, however, causes volumetric expansion of the Si electrode of over 400%. This expansion causes strain in the electrode, and this strain is released by formation of fractures and eventual electrode failure. Repeated cycling between $Li_xSi_y$ and Si thus causes crumbling of the electrode and loss of interconnectivity of the material. For example, 1 μm thick Si film anodes have displayed short cyclability windows, with a precipitously capacity drop after only 20 cycles. Accordingly, new structures for silicon compositions are needed to support the large volumetric expansion of this anodic material.

Moreover, formation cycles of Si based anodes consume, irreversible, a large percentage of the lithium available in a cell. This formation-cycle loss, typically associated with the deposition of a solid-electrolyte interface (SEI) between the silicon and an electrolytic solution, limits the utility of silicon in a lithium ion battery. Accordingly, new structures for silicon compositions are needed that limit formation cycle loss and promote stable anode capacities with repetitive cycling.

SUMMARY

A first embodiment is a particulate that features a carbon matrix having embedded therein a plurality of amorphous silicon nanoparticles.

A second embodiment is a particulate that features a porous carbon matrix having a plurality of pores carried therein, the pores providing an interior surface and an open volume; and a plurality of amorphous silicon nanoparticles affixed to the interior surface of the porous carbon matrix and adjacent to the open volume.

A third embodiment is an anode active particulate that features a plurality of amorphous silicon nanoparticles affixed to interior surfaces of a porous carbon matrix, the amorphous silicon nanoparticles individually comprising amorphous silicon domains and crystalline silicon domains, where the crystalline silicon domains have an average domain size of less than 20 nm; and where the atom ratio of amorphous silicon domains to crystalline silicon domains is in the range of about 1:1 to about 1000:1; the anode active particulate having a "Standard-FOE" value that is about 5% greater than a "Standard-FOE" value of an analogous anode active particle having crystalline silicon nanocrystals; where the crystalline silicon nanocrystals individually comprising amorphous silicon domains and crystalline silicon domains, and where the atom ratio of amorphous silicon domains to crystalline silicon domains is in the range of about 1:1000 to about 1:5

BRIEF DESCRIPTION OF THE FIGURES

For a more complete understanding of the disclosure, reference should be made to the following detailed description and accompanying drawing figures wherein.

Figure 1:
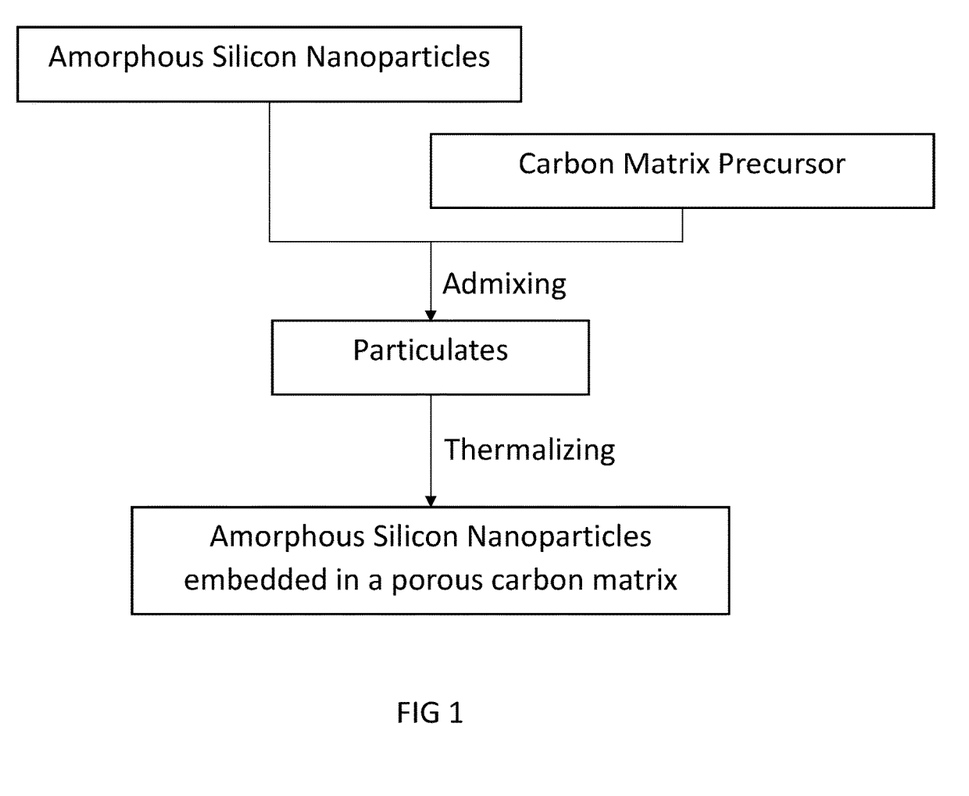
FIG. 1 is a schematic of a process of forming the as described particulates that include a plurality of amorphous silicon nanoparticles carried/embedded in a porous carbon matrix.
Figure 2:
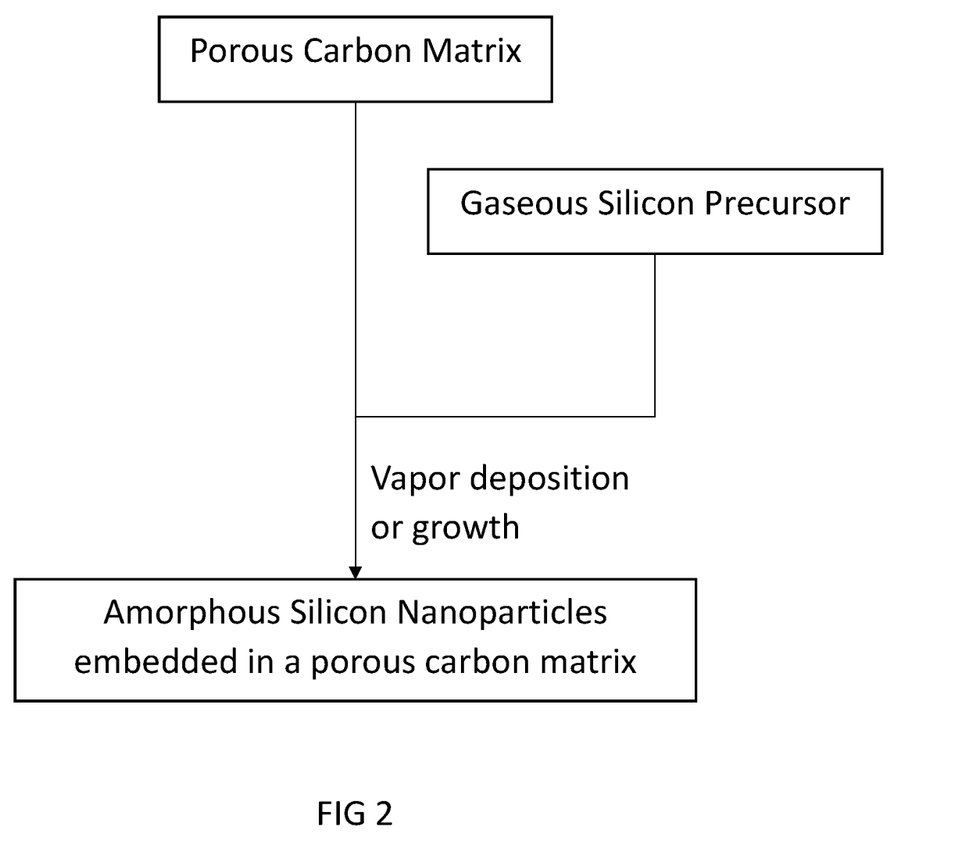
FIG. 2 is a schematic of a second process of forming the as described particulates that include a plurality of amorphous silicon nanoparticles carried/embedded in a porous carbon matrix.

While specific embodiments are illustrated in the figures, with the understanding that the disclosure is intended to be illustrative, these embodiments are not intended to limit the invention described and illustrated herein.

DETAILED DESCRIPTION

Objects, features, and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

Herein, the use of the word "a" or "an" when used in conjunction with the term "comprising" in the claims and/or the specification may mean "one," but it is also consistent with the meaning of "one or more," "at least one," and "one or more than one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or." Furthermore, the transitional phrase "consisting essentially of" limits a scope to the specified materials or steps and those that do not materially affect basic and novel characteristic.

One embodiment of the invention herein is a particulate useful in the formation of an anode for a lithium ion battery. Herein, particulates are small individual items, preferably, having a discrete size and shape; for example, having an average cross-section of less than about 25 µm and an approximately spherical morphology. Preferably, the particulate includes a carbon matrix having embedded therein a plurality of amorphous silicon nanoparticles. The term embedded means the amorphous silicon nanoparticles are affixed to the carbon matrix by, for example, chemisorption, physisorption, covalent bonding, ionic bonding, or mixtures thereof. In one instance, embedded means the amorphous silicon nanoparticles is fixed to or into a surface of the carbon matrix.

Herewith, amorphous silicon nanoparticles do not have the long range ordering of a crystalline lattice. For silicon, the amorphous vs. crystalline content can be observed in the Raman spectrum. The strong band at 521 $cm^{-1}$ of a crystalline sample is clearly distinguishable from a broad band centered at about 480 $cm^{-1}$ that is exhibited by the amorphous silicon. These very distinct spectra make it possible to use a simple Beer's law calculation based on the ratio of the peak heights at 521 $cm^{-1}$ and 480 $cm^{-1}$ to estimate the relative amounts of the two forms. The amorphous silicon nanoparticles can include an atom ratio of the silicon in amorphous silicon (a-Si) domains to silicon in crystalline silicon (c-Si) domains, where the a-Si:c-Si ratio is in the range of about 1:1 to about 1000:1. In other instances, the ratio can be in the range of about 1:1 to about 100:1, about 1:1 to about 50:1, about 1:1 to about 25:1, about 1:1 to about 20:1, about 1:1 to about 15:1, about 1:1 to about 10:1, about 2:1 to about 100:1, about 2:1 to about 50:1, about 2:1 to about 25:1, about 2:1 to about 20:1, about 2:1 to about 15:1, or about 2:1 to about 10:1. Preferably, greater than about 50 atom %, about 60 atom %, about 70 atom %, about 80 atom %, about 90 atom %, or about 95 atom % of the silicon is in an amorphous silicon domain. In another preferable instance, the amorphous silicon nanoparticles consist essentially of, or consist of, amorphous silicon domains. In another instance, an absence of a crystalline species can be observed in the X-ray diffraction (XRD) of the particulate. As XRD is not typically a quantitative technique, the XRD pattern of the particulate may display reflections that correspond to crystalline silicon but, qualitatively, one of ordinary skill can appreciate the lack of crystallinity in the particulate. That is, even in instances wherein the atom percentage of silicon in amorphous domains is in excess of 95%, the Si(111) reflection may be observable. Preferably, the Si(111) reflection (at about 28.5° 2Θ) has a peak width at half height of greater than about 0.2°, 0.3°, 0.4°, 0.5°, 0.6°, 0.7°, 0.8°, 0.9°, 1°, 1.1°, 1.2°, 1.3°, 1.4°, 1.5°, 1.6°, 1.7°, 1.8°, 1.9°, 2°, 2.1°, 2.2°, 2.3°, 2.4°, 2.5°, 2.6°, 2.7°, 2.8°, 2.9°, 3°, 3.1°, 3.2°, 3.3°, 3.4°, 3.5°, 3.6°, 3.7°, 3.8°, 3.9°, 4°, 4.1°, 4.2°, 4.3°, 4.4°, 4.5°, 4.6°, 4.7°, 4.8°, 4.9°, or 5°.

In one instance, the amorphous silicon nanoparticles embedded in the carbon matrix include greater than about 70 wt. %, 75 wt. %, 80 wt. %, 85 wt. %, 90 wt. %, about 95 wt. %, about 98 wt. %, about 99 wt. %, about 99.5 wt. %, or about 99.9 wt. % silicon. In one instance, the amorphous silicon nanoparticles consist essentially of silicon. In another instance, the amorphous silicon nanoparticles consist of silicon. In one example, the amorphous silicon nanoparticles include amorphous hydrogenated silicon (a-Si:H). In another example, the amorphous silicon nanoparticles include n-doped or p-doped silicon.

In yet another example, the amorphous silicon nanoparticles include a silicon alloy. The silicon alloy can be a binary alloy (silicon plus one alloying element), can be a tertiary alloy, or can include a plurality of alloying elements. The silicon alloy is understood to include a majority silicon. A majority silicon means that the nanoparticles have a weight percentage that is greater than about 50% (50 wt. %) silicon, preferably greater than about 60 wt. %, 70 wt. %, 80 wt. %, 90 wt. %, 95 wt. %, 96 wt. %, 97 wt. %, 98 wt. %, 99 wt. %, or 99.5 wt. % silicon. The alloying element can be, for example, an alkali metal, an alkaline-earth metal, a Group 13 to 16 element, a transition metal group element, a rare earth group element, or a combination thereof, but, obviously, not Si. The alloying element can be, for exmaple, Li, Na, Mg, Ca, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, B, Al, Ga, In, Ge, Sn, P, As, Sb, Bi, S, Se, Te, or a combination thereof. In one instance, the alloying element can be lithium, magnesium, aluminum, titanium, vanadium, chromium, manganese, iron, cobalt, nickel, copper, or a mixture thereof. In another instance, the alloying element can be selected from copper, silver, gold, or a mixture thereof. In still another instance, the silicon alloy can be selected from a SiTiNi alloy, a SiAlMn alloy, a SiAlFe alloy, a SiFeCu alloy, a SiCuMn alloy, a SiMgAl alloy, a SiMgCu alloy, or a combination thereof.

As the term alloy typically infers a homogeneous distribution of the alloying element(s) in the base material, silicon, the amorphous silicon nanoparticles can further include a heterogeneous distribution of alloying elements in the nanoparticles. In some instances, these alloy elements form intermetallics in the amorphous silicon nanoparticles. An intermetallic (also called an intermetallic compound, intermetallic alloy, ordered intermetallic alloy, and a long-range-ordered alloy) is an alloy that forms a solid-state compound exhibiting defined stoichiometry and ordered crystal structure; here, within the amorphous silicon nanoparticle composition (e.g., a NiSi intermetallic within Si).

Herewith, amorphous, in relation to alloys, means that the amorphous silicon nanoparticle is, preferably, free of reflections associated with the Si XRD pattern, e.g., is free of the Si(111) reflection. More preferably, the Raman spectra of the amorphous silicon-alloy nanoparticle is free of an absorption at 521 cm$^{-1}$. Notably, the amorphous silicon-alloy nanoparticle can include a portion of the Si in a crystalline domain, preferably, greater than about 50 atom %, about 60 atom %, about 70 atom %, about 80 atom %, about 90 atom %, or about 95 atom % of the silicon is in an amorphous domain. In one instance, the atom ratio of the silicon in amorphous domains to silicon in crystalline domains (a-Si:c-Si) is in the range of about 1:1 to about 1000:1, about 1:1 to about 100:1, about 1:1 to about 50:1, about 1:1 to about 25:1, about 1:1 to about 20:1, about 1:1 to about 15:1, about 1:1 to about 10:1, about 2:1 to about 100:1, about 2:1 to about 50:1, about 2:1 to about 25:1, about 2:1 to about 20:1, about 2:1 to about 15:1, or about 2:1 to about 10:1. Still further, a portion, preferably less than 25 atom %, 20 atom %, 15 atom %, 10 atom %, or 5 atom %, of the Si is in a crystalline domain associated with an intermetallic.

The amorphous silicon nanoparticles, preferably, have an average diameter of less than about 1,000 nm, 900 nm, 800 nm, 700 nm, 600 nm, 500 nm, 400 nm, 300 nm, or 250 nm. In another instance, the amorphous silicon nanoparticles have an average diameter of from about 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, or 100 nm to about 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, or 1,000 nm. In specific instances, the amorphous silicon nanoparticles have an average diameter of about 50 nm to about 1,000 nm, about 50 nm to about 800 nm, about 50 nm to about 750 nm, about 50 nm to about 700 nm, about 50 nm to about 650 nm, about 50 nm to about 600 nm, about 50 nm to about 550 nm, about 50 nm to about 500 nm, about 50 nm to about 450 nm, about 50 nm to about 400 nm, about 50 nm to about 350 nm, about 50 nm to about 300 nm, about 100 nm to about 750 nm, about 100 nm to about 600 nm, about 100 nm to about 500 nm, about 100 nm to about 400 nm, or about 100 nm to about 300 nm. In one instance, amorphous silicon nanoparticles have a spherical morphology. In another instance, the amorphous silicon nanoparticles can have a plate-like morphology.

In one example, the carbon matrix can be a polymer. The polymer is preferably an anodically inactive polymer, that is, the polymer would not reduce or oxidize during the cycling of a battery. In another instance, the polymer is a conductive polymer or can be an admixture of an insulative polymer and a conductive polymer, or can be a copolymer where one block of the copolymer is conductive. In one instance, the conductive polymer, or conductive blocks, can be electrically conductive, for example including polyacetylene, polypyrrole, polythiophene, polyaniline, polyphenylene, and polyphenylenevinylene. In another instance, the conductive polymer, or conductive blocks, can be ionically conductive, for example including polyvinyl alcohol, polyvinyl acetate, polyvinylidenfluoride, polyethylene carbonate, polyethylene oxide, polypropylene oxide, and admixtures thereof.

Preferably, the carbon matrix includes a carbon-constituent material and, optionally, nanofibers embedded therein. The carbon-constituent material can be a reduced carbon-based material that binds/holds the, optional, nanofibers and, preferably, is composed of at least 50 wt. %, 60 wt. %, 70 wt. %, 80 wt. %, 90 wt. %, 95 wt. %, or 99 wt. % carbon (i.e., elemental carbon or reduced carbon). In one instance, the carbon-constituent material consists essentially of carbon. In another instance, the carbon-constituent material is the thermolysis product of a carbon matrix precursor. A carbon matrix precursor is an organic compound that can be thermally processed to provide a carbon matrix; that is, the carbon matrix precursor is an organic compound that can be thermally reduced to provide reduced carbon. Examples of carbon matrix precursors include phenolic resin, pitch, polyacrylonitrile, poly(furfuryl alcohol), and mixtures thereof. Preferably, the carbon matrix precursor is solid at room temperature and pressure; more preferably, the carbon matrix precursor has a melting and/or softening point that is greater than 100° C., 150° C., 200° C., 250° C., or 300° C. Other examples of useful carbon material precursors include, coal tar pitch from soft pitch to hard pitch; coal-derived heavy oil such as dry-distilled liquefaction oil; petroleum-based heavy oils including directly distilled heavy oils such as atmospheric residue and vacuum residue, crude oil, and decomposed heavy oil such as ethylene tar produced during a thermal decomposition process of naphtha and so on; aromatic hydrocarbons such as acenaphthylene, decacyclene, anthracene and phenanthrene; polyphenylenes such as phenazine, biphenyl and terphenyl; polyvinyl chloride; water-soluble polymers such as polyvinyl alcohol, polyvinyl butyral and polyethylene glycol and insolubilized products thereof; nitrogen-containing polyacrylonitriles; organic polymers such as polypyrrole; organic polymers such as sulfur-containing polythiophene and polystyrene; natural polymers such as saccharides, e.g. glucose, fructose, lactose, maltose and sucrose; thermoplastic resins such as polyphenylene sulfide and polyphenylene oxide; thermosetting resins such as phenol-formaldehyde resin and imide resin; and mixtures thereof.

Generally, the particulate includes the carbon matrix having the amorphous silicon nanoparticles embedded therein. In one example, the particulate consists essentially of the carbon matrix and the amorphous silicon nanoparticles. In another example, the particulate consists of the carbon matrix and the amorphous silicon nanoparticles.

The particulates feature a mass ratio of the carbon matrix to the amorphous silicon nanoparticles, preferably at a ratio of about 10:1 to about 1:10, about 5:1 to about 1:10, about 2:1 to about 1:10, about 1:1 to about 1:10, about 1:1 to about 1:5, about 1:1 to about 1:3. In a particularly preferably instance, the mass ratio can be from about 3:1 to about 1:3, about 2:1 to about 1:3, about 1:1 to about 1:3, about 3:1 to about 1:2, about 3:1 to about 1:1, or about 2:1 to about 1:2.

The particulate, preferably, has an average cross section of about 1 to about 25 μm. More preferably, the average cross section is about 5 to about 15 μm. In other examples, the particulate can have an average cross section from about 1 μm, about 2 μm, about 3 μm, about 4 μm, about 5 μm, about 6 μm, about 7 μm, about 8 μm, about 9 μm, or about 10 μm, to about 11 μm, about 12 μm, about 13 μm, about 14 μm, about 15 μm, about 16 μm, about 17 μm, about 18 μm, about 19 μm, or about 20 μm.

A second embodiment is a particulate that features a porous carbon matrix having a plurality of pores carried therein, the pores providing an interior surface and an open volume. The particulate further having a plurality of amorphous silicon nanoparticles affixed to the interior surface of the porous carbon matrix and adjacent to the open volume.

In certain instances, a portion of or all of the pores are in fluidic contact with an exterior surface of the particulate. In other instances, all or a portion of the pores are sealed or held completely within the particulate, for example, are not in fluidic contact with the exterior surface of the particulate. The pores can have a plurality of diameters, yet are preferably less than about 1 nm, 5 nm, 10 nm, 15 nm, 20 nm, 25 nm, 30 nm, 35 nm, 40 nm, 45 nm, or 50 nm. In one instance, the amorphous silicon nanoparticles are in fluidic contact with the pores. In another instance, the particulates have a porosity (the sum of the volumes of the individual pores) that is greater than at least 25 vol. %, 50 vol. %, 75 vol. %, or 100 vol. % of the amorphous silicon nanoparticles' initial volume. That is, the amorphous silicon nanoparticles have an initial volume that is the sum of the individual nanoparticle's volumes and the open volume, the porosity, of the entire particulate is greater than the total volume of the amorphous silicon nanoparticles by at least 25%, 50%, 75%, or 100%.

The particulate can have a composition that includes the porous carbon matrix and the amorphous silicon nanoparticles. On a total mass basis, the particulate can include about 1 wt. % to about 75 wt. % silicon, about 1 wt. % to about 50 wt. % silicon, preferably about 5 wt. % to about 40 wt. % silicon, about 10 wt. % to about 35 wt. % silicon, or about 15 wt. % to about 30 wt. % silicon. Additionally, the particulate can include about 10 wt. % to about 90 wt. % carbon, about 20 wt. % to about 90 wt. % carbon, about 25 wt. % to about 90 wt. % carbon, preferably about 20 wt. % to about 80 wt. % carbon, about 30 wt. % to about 70 wt. % carbon, about 40 wt. % to about 65 wt. % carbon, or about 40 wt. % to about 60 wt. % carbon.

In one example, the particulate can include about 10 wt. % to about 90 wt. % carbon, about 10 wt. % to about 80 wt. % carbon, about 10 wt. % to about 75 wt. % carbon, about 20 wt. % to about 70 wt. % carbon, about 20 wt. % to about 65 wt. % carbon, about 20 wt. % to about 50 wt. % carbon, or about 20 wt. % to about 40 wt. % carbon and further include about 10 wt. % to about 90 wt. % silicon, preferably about 20 wt. % to about 90 wt. % silicon, about 25 wt. % to about 90 wt. % silicon, about 30 wt. % to about 80 wt. %, about 35 wt. % to about 80 wt. %, about 50 wt. % to about 80 wt. %, or about 60 wt. % to about 80 wt. % silicon. In a preferable instance, the particulate includes about 10 wt. % to about 90 wt. % porous carbon matrix and about 90 wt. % to about 10 wt. % amorphous silicon nanoparticles; in another preferably instance, the particulate includes about 10 wt. % to about 50 wt. % porous carbon matrix and about 90 wt. % to about 50 wt. % amorphous silicon nanoparticles.

In still another instance, the porous carbon matrix comprises, consists essentially of, or consists of elemental carbon while the amorphous silicon nanoparticles comprise, consists essentially of, or consist of silicon.

In yet another instance, the amorphous silicon nanoparticles individually comprise amorphous silicon domains and crystalline silicon domains. Herewith, the amorphous silicon domains may or may not be indistinguishable from each other, especially if they are adjacent, accordingly, the term is used in the plural, yet the nanoparticles may only contain a single observable amorphous domain, for example by TEM.

The amorphous silicon nanoparticles can include an atom ratio of the silicon in amorphous silicon domains to silicon in crystalline silicon domains, where the a-Si:c-Si ratio is in the range of about 1:1 to about 1000:1. In other instances, the ratio can be in the range of about 1:1 to about 100:1, about 1:1 to about 50:1, about 1:1 to about 25:1, about 1:1 to about 20:1, about 1:1 to about 15:1, about 1:1 to about 10:1, about 2:1 to about 100:1, about 2:1 to about 50:1, about 2:1 to about 25:1, about 2:1 to about 20:1, about 2:1 to about 15:1, or about 2:1 to about 10:1. Preferably, greater than about 50 atom %, about 60 atom %, about 70 atom %, about 80 atom %, about 90 atom %, or about 95 atom % of the silicon in both the particulate and in the amorphous silicon nanoparticles is in an amorphous silicon domain. In another preferable instance, the amorphous silicon nanoparticles consist essentially of, or consist of, amorphous silicon domains.

The amorphous silicon nanoparticles embedded in the porous carbon matrix include greater than about 70 wt. %, 75 wt. %, 80 wt. %, 85 wt. %, 90 wt. %, 95 wt. %, 98 wt. %, 99 wt. %, 99.5 wt. %, or 99.9 wt. % silicon. In one instance, the amorphous silicon nanoparticles consist essentially of silicon. In another instance, the amorphous silicon nanoparticles consist of silicon. In one example, the amorphous silicon nanoparticles include amorphous hydrogenated silicon (a-Si:H). In another example, the amorphous silicon nanoparticles include n-doped or p-doped silicon.

In yet another example, the amorphous silicon nanoparticles include a silicon alloy. The silicon alloy can be a binary alloy (silicon plus one alloying element), can be a tertiary alloy, or can include a plurality of alloying elements. The silicon alloy is understood to include a majority silicon. A majority silicon means that the nanoparticles have a weight percentage that is greater than about 50% (50 wt. %) silicon, preferably greater than about 60 wt. %, 70 wt. %, 80 wt. %, 90 wt. %, 95 wt. %, 96 wt. %, 97 wt. %, 98 wt. %, 99 wt. %, or 99.5 wt. % silicon. The alloying element can be, for example, an alkali metal, an alkaline-earth metal, a Group 13 to 16 element, a transition metal group element, a rare earth group element, or a combination thereof, but, obviously, not Si. The alloying element can be, for example, Li, Na, Mg, Ca, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, B, Al, Ga, In, Ge, Sn, P, As, Sb, Bi, S, Se, Te, or a combination thereof. In one instance, the alloying element can be lithium, magnesium, aluminum, titanium, vanadium, chromium, manganese, iron, cobalt, nickel, copper, or a mixture thereof. In another instance, the alloying element can be selected from copper, silver, gold, or a mixture thereof. In still another instance, the silicon alloy can be selected from a SiTiNi alloy, a SiAlMn alloy, a SiAlFe alloy, a SiFeCu alloy, a SiCuMn alloy, a SiMgAl alloy, a SiMgCu alloy, or a combination thereof.

As the term alloy typically infers a homogeneous distribution of the alloying element(s) in the base material, silicon, the amorphous silicon nanoparticles can further include a heterogeneous distribution of alloying elements in the nanoparticles. In some instances, these alloy elements form intermetallics in the amorphous silicon nanoparticles. An intermetallic (also called an intermetallic compound, intermetallic alloy, ordered intermetallic alloy, and a long-range-ordered alloy) is an alloy that forms a solid-state compound exhibiting defined stoichiometry and ordered crystal structure; here, within the amorphous silicon nanoparticle composition (e.g., a NiSi intermetallic within Si).

The crystalline silicon domains, preferably, have an average crystalline domain size of less than about 50 nm, about 40 nm, about 30 nm, about 20 nm, about 15 nm, or about 10 nm. In another instance, the average crystalline domain size is in the range between about 5 nm, 10 nm, 15 nm, or 20 nm to about 50 nm, 40 nm, 30 nm, or 20 nm.

In another example, the open volume can carry a fluid, or a portion of the open volume can carry a fluid. In one instance, about 10 vol. %, about 15 vol. %, about 20 vol. %, about 25 vol. %, about 30 vol. %, about 35 vol. %, about 40 vol. %, about 45 vol. %, about 50 vol. %, about 55 vol. %, about 60 vol. %, about 65 vol. %, about 70 vol. %, about 75 vol. %, about 80 vol. %, or about 85 vol. % of the open volume carries a fluid. Herewith, the fluid can be an organic fluid, an inorganic fluid, or a mixture thereof. The organic fluid can include ethylene carbonate, fluoroethylene carbonate, propylene carbonate, propane, butane, pentane, hexane, heptane, octane, nonane, decane, dodecane, phenol, benzene, toluene, xylene, or a mixture thereof. The inorganic fluid can include water, ammonia, carbon dioxide, or a mixture thereof.

Still another embodiment is an anode active particulate that features a plurality of amorphous silicon nanoparticles affixed to interior surfaces of a porous carbon matrix. The amorphous silicon nanoparticles individually comprising amorphous silicon domains and crystalline silicon domains, where the crystalline silicon domains have an average domain size of less than 50 nm; and where the atom ratio of silicon in amorphous silicon domains to silicon in crystalline silicon domains is in the range of about 1:1 to about 1000:1.

The crystalline silicon domains, preferably, have an average crystalline domain size of less than about 50 nm, about 40 nm, about 30 nm, about 20 nm, about 15 nm, or about 10 nm. In another instance, the average crystalline domain size is in the range between about 5 nm, 10 nm, 15 nm, or 20 nm to about 50 nm, 40 nm, 30 nm, or 20 nm. In one instance, the amorphous silicon nanoparticles embedded in the carbon matrix include greater than about 70 wt. %, 75 wt. %, 80 wt. %, 85 wt. %, 90 wt. %, about 95 wt. %, about 98 wt. %, about 99 wt. %, about 99.5 wt. %, or about 99.9 wt. % silicon. In one instance, the amorphous silicon nanoparticles consist essentially of silicon. In another instance, the amorphous silicon nanoparticles consist of silicon. In one example, the amorphous silicon nanoparticles include amorphous hydrogenated silicon (a-Si:H). In another example, the amorphous silicon nanoparticles include n-doped or p-doped silicon.

In yet another example, the amorphous silicon nanoparticles include a silicon alloy. The silicon alloy can be a binary alloy (silicon plus one alloying element), can be a tertiary alloy, or can include a plurality of alloying elements. The silicon alloy is understood to include a majority silicon. A majority silicon means that the nanoparticles have a weight percentage that is greater than about 50% (50 wt. %) silicon, preferably greater than about 60 wt. %, 70 wt. %, 80 wt. %, 90 wt. %, 95 wt. %, 96 wt. %, 97 wt. %, 98 wt. %, 99 wt. %, or 99.5 wt. % silicon. The alloying element can be, for example, an alkali metal, an alkaline-earth metal, a Group 13 to 16 element, a transition metal group element, a rare earth group element, or a combination thereof, but, obviously, not Si. The alloying element can be, for example, Li, Na, Mg, Ca, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, B, Al, Ga, In, Ge, Sn, P, As, Sb, Bi, S, Se, Te, or a combination thereof. In one instance, the alloying element can be lithium, magnesium, aluminum, titanium, vanadium, chromium, manganese, iron, cobalt, nickel, copper, or a mixture thereof. In another instance, the alloying element can be selected from copper, silver, gold, or a mixture thereof. In still another instance, the silicon alloy can be selected from a SiTiNi alloy, a SiAlMn alloy, a SiAlFe alloy, a SiFeCu alloy, a SiCuMn alloy, a SiMgAl alloy, a SiMgCu alloy, or a combination thereof. As the term alloy typically infers a homogeneous distribution of the alloying element(s) in the base material, silicon, the amorphous silicon nanoparticles can further include a heterogeneous distribution of alloying elements in the nanoparticles. In some instances, these alloy elements form intermetallics in the amorphous silicon nanoparticles. An intermetallic (also called an intermetallic compound, intermetallic alloy, ordered intermetallic alloy, and a long-range-ordered alloy) is an alloy that forms a solid-state compound exhibiting defined stoichiometry and ordered crystal structure; here, within the amorphous silicon nanoparticle composition (e.g., a NiSi intermetallic within Si).

The amorphous silicon nanoparticles, preferably, have an average diameter of less than about 1,000 nm, 900 nm, 800 nm, 700 nm, 600 nm, 500 nm, 400 nm, 300 nm, or 250 nm. In another instance, the amorphous silicon nanoparticles have an average diameter of from about 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, or 100 nm to about 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, or 1,000 nm. In specific instances, the amorphous silicon nanoparticles have an average diameter of about 50 nm to about 1,000 nm, about 50 nm to about 800 nm, about 50 nm to about 750 nm, about 50 nm to about 700 nm, about 50 nm to about 650 nm, about 50 nm to about 600 nm, about 50 nm to about 550 nm, about 50 nm to about 500 nm, about 50 nm to about 450 nm, about 50 nm to about 400 nm, about 50 nm to about 350 nm, about 50 nm to about 300 nm, about 100 nm to about 750 nm, about 100 nm to about 600 nm, about 100 nm to about 500 nm, about 100 nm to about 400 nm, or about 100 nm to about 300 nm. In one instance, amorphous silicon nanoparticles have a spherical morphology. In another instance, the amorphous silicon nanoparticles can have a plate-like morphology.

The amorphous silicon nanoparticles can include an atom ratio of the silicon in amorphous silicon domains to silicon in crystalline silicon domains, where the a-Si:c-Si ratio is in the range of about 1:1 to about 1000:1. In other instances, the ratio can be in the range of about 1:1 to about 100:1, about 1:1 to about 50:1, about 1:1 to about 25:1, about 1:1 to about 20:1, about 1:1 to about 15:1, about 1:1 to about 10:1, about 2:1 to about 100:1, about 2:1 to about 50:1, about 2:1 to about 25:1, about 2:1 to about 20:1, about 2:1 to about 15:1, or about 2:1 to about 10:1. Preferably, greater than about 50 atom %, about 60 atom %, about 70 atom %, about 80 atom %, about 90 atom %, or about 95 atom % of the silicon in both the particulate and in the amorphous silicon nanoparticles is in an amorphous silicon domain. In another preferable instance, the amorphous silicon nanoparticles consist essentially of, or consist of, amorphous silicon domains.

The porous carbon matrix includes a carbon-constituent material which can be a reduced carbon-based material, preferably, is composed of at least 50 wt. %, 60 wt. %, 70 wt. %, 80 wt. %, 90 wt. %, 95 wt. %, or 99 wt. % carbon (i.e., elemental carbon or reduced carbon). In one instance, the carbon-constituent material consists essentially of carbon. In another instance, the carbon-constituent material is the thermolysis product of a porous carbon matrix precursor. A porous carbon matrix precursor is an organic compound that can be thermally processed to provide a porous carbon matrix; that is, the porous carbon matrix precursor is an organic compound that can be thermally reduced to provide reduced carbon. Examples of porous carbon matrix precursors include phenolic resin, pitch, polyacrylonitrile, poly (furfuryl alcohol), and mixtures thereof. Preferably, the porous carbon matrix precursor is solid at room temperature and pressure; more preferably, the porous carbon matrix precursor has a melting and/or softening point that is greater than about 100° C., 150° C., 200° C., 250° C., or 300° C. Other examples of useful carbon material precursors include, coal tar pitch from soft pitch to hard pitch; coal-derived heavy oil such as dry-distilled liquefaction oil; petroleum-based heavy oils including directly distilled heavy oils such as atmospheric residue and vacuum residue, crude oil, and decomposed heavy oil such as ethylene tar produced during a thermal decomposition process of naphtha and so on; aromatic hydrocarbons such as acenaphthylene, decacyclene, anthracene and phenanthrene; polyphenylenes such as phenazine, biphenyl and terphenyl; polyvinyl chloride; water-soluble polymers such as polyvinyl alcohol, polyvinyl butyral and polyethylene glycol and insolubilized products thereof; nitrogen-containing polyacrylonitriles; organic polymers such as polypyrrole; organic polymers such as sulfur-containing polythiophene and polystyrene; natural polymers such as saccharides, e.g. glucose, fructose, lactose, maltose and sucrose; thermoplastic resins such as polyphenylene sulfide and polyphenylene oxide; thermosetting resins such as phenol-formaldehyde resin and imide resin; and mixtures thereof.

Generally, the particulate includes the porous carbon matrix having the amorphous silicon nanoparticles embedded therein. In one example, the particulate consists essentially of the porous carbon matrix and the amorphous silicon nanoparticles. In another example, the particulate consists of the porous carbon matrix and the amorphous silicon nanoparticles.

The particulates feature a mass ratio of the carbon matrix to the amorphous silicon nanoparticles, preferably at a ratio of about 10:1 to about 1:10, about 5:1 to about 1:10, about 2:1 to about 1:10, about 1:1 to about 1:10, about 1:1 to about 1:5, about 1:1 to about 1:3. In a particularly preferably instance, the mass ratio can be from about 3:1 to about 1:3, about 2:1 to about 1:3, about 1:1 to about 1:3, about 3:1 to about 1:2, about 3:1 to about 1:1, or about 2:1 to about 1:2.

Preferably, the anode active particulate has a "Standard-FCE" value that is about 5% (5 percentage points) greater than a "Standard-FCE" value of an analogous anode active particle having crystalline silicon nanoparticles which individually comprise amorphous silicon domains and crystalline silicon domains, and where the atom ratio of silicon in amorphous silicon domains to silicon in crystalline silicon domains is in the range of about 1:1000 to about 1:5.

Herewith, a "Standard-FCE" value of an anode active material is the first coulombic efficiency (FCE) of a cell built with that anode active material; while FCEs are typically obtained for anode active materials, the term herein relates to the FCE values obtained from two identical cell builds; one cell built with an anode active particulate that includes the amorphous silicon nanoparticles (an amorphous Standard-FCE) and one cell built with the anode active particulate that includes crystalline silicon nanoparticles (a crystalline Standard-FCE). Preferably, the anode active particulate that includes the amorphous silicon nanoparticles and the anode active particulate that includes crystalline silicon nanoparticles are structurally and compositionally identical but for the difference in the crystallinity of the nanoparticles. In a particularly preferable instance, the anode active particulate "Standard-FCE" value is greater than about 90% while the analogous anode active particle "Standard-FCE" is less than about 85%. More preferable, the analogous anode active particle "Standard-FCE" is less than about 80%. Preferably, "Standard-FCE" values are determined from coin-type cells with lithium counter electrode, a tri-layer polymer separator, and an electrolyte of 1.2 M $LiPF_6$ in 3:7 (wt:wt) ethylene carbonate (EC):ethyl methyl carbonate (EMC)+10 wt. % fluoroethylene carbonate (FEC).

The above described particulates, including the porous carbon matrix having the amorphous silicon nanoparticles embedded therein, can be prepared by admixing amorphous silicon nanoparticles with a porous carbon matrix. Alternatively, the amorphous silicon nanoparticles can be admixed with a carbon matrix precursor and formed, in one instance, into particulates. The as-formed particulates can then be thermalized (e.g., at a temperature between about 300° C. and about 850° C., about 400° C., and about 800° C., about 450° C. and about 750° C., or about 500° C. and about 700° C.) to convert the carbon matrix precursor into a porous carbon matrix. In a preferable instance, the particulates are not heated above about 800° C., more preferably, the particulates are not heated above 800° C. for greater than about 180 seconds.

Yet another embodiment is an anode that includes one of the aforementioned particulates. Preferably, the anode can include a majority (by weight) of the particulate (inclusive of the anode active particulate). In one instance, the anode includes an admixture of the particulate and a binder carried on a current collector. Preferably, the anode has a specific capacity of about 500 to about 3,500 mAh/g, about 1,000 to about 3,500 mAh/g, about 1,200 to about 3,500 mAh/g, about 1,000 to about 3,000 mAh/g, about 1,000 to about 2,500 mAh/g, about 1,200 to about 2,500 mAh/g, or about 1,500 to about 2,500 mAh/g.

In some embodiments, the polymer binder may include, but not limited to, at least one selected from the group consisting of styrene-butadiene rubber, acrylated styrene-butadiene rubber, acrylonitrile-butadiene rubber, acrylonitrile-butadiene-styrene rubber, acryl rubber, butyl rubber, fluorine rubber, polytetrafluoroethylene, polyethylene, polypropylene, an ethylene-propylene copolymer, polyethylene oxide, polyvinylpyrolidone, polyepichlorohydrin, polyphosphazene, polyacrylate, polyacrylonitrile, polystyrene, an ethylene propylene diene copolymer, polyvinylpyridine, chlorosulfonated polyethylene, latex, polyester resin, acryl resin, phenolic resin, epoxy resin, polyvinylalcohol, carboxymethyl cellulose, hydroxypropylmethyl cellulose, hydroxypropylcellulose, di acetylcellulose, and any combinations thereof.

In some embodiments, the polymer binder may be an aqueous polymer binder or a nonaqueous polymer binder. The aqueous polymer binder particles may refer to a water-dispersible (waterborne) polymer binder able to be easily dispersed or dissolved in water.

In some embodiments, the binder composition for a secondary battery may, optionally, further include an anti-aging agent, anti-staling agent, or an anti-foaming agent.

For example, the anode may be manufactured by molding an anode active material composition including an anode active material and any of the binder composition dispersions described herein into a desired shape, or coating the anode active material composition on a current collector such as a copper foil, or the like.

For example, an anode active material, a conducting agent, a binder composition dispersion for a secondary battery as described above, and a solvent may be mixed to prepare an anode active material composition. The anode active material composition may be directly coated on a metallic current collector to prepare an anode plate. In some embodiments, the anode active material composition may be cast on a separate support to form an anode active material film, which may then be separated from the support and laminated on a metallic current collector to prepare an anode plate. The anode may have any of a variety of forms, not limited to the above-described forms.

Non-limiting examples of the conducting agent are acetylene black, ketjen black, natural graphite, artificial graphite, carbon black, carbon fiber, and metal powder and metal fiber of, for example, copper, nickel, aluminum or silver. In some instance, at least one conducting material such as polyphenylene derivatives may be used in combination. Any conducting agent available in the art may be used. The above-described crystalline carbonaceous materials may be further added as the conducting agent.

In some embodiments, the anode active material composition may further include a conventional binder used in the art, in addition to the binder composition for a secondary battery according to any of the above-described embodiments. Examples of the conventional binder are a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but are not limited thereto. Any material available as a binding agent in the art may be used.

Non-limiting examples of the solvent are N-methyl-pyrrolidone, acetone, and water. Any material available as a solvent in the art may be used.

The amounts of the anode active material, the conducting agent, the binder, and the solvent may be those levels generally used in lithium batteries. At least one of the conducting agent, the binder and the solvent may not be used depending on the use and the structure of the lithium battery.

Still another embodiment is a cell utilizing the above described anode. Herewith, the cell shows less than 20%, 10%, 9%, 8%, 7%, 6%, 5%, 4%, 3%, 2%, or 1% first cycle capacity loss. Alternatively, the first coulombic efficiency of the cell is preferably above about 80%, 90%, 91%, 92%, 93%, 94%, 95%, 96%, 97%, 98%, or 99%. In another instance, the herein described anode has a "Standard-FCE" value that is about 5% greater than a "Standard-FCE" value of an analogous anode prepared with crystalline silicon nanocrystals; where the crystalline silicon nanocrystals individually comprising amorphous silicon domains and crystalline silicon domains, and where the atom ratio of amorphous silicon domains to crystalline silicon domains is in the range of about 1:1000 to about 1:5. Herewith, the Standard-FCE value is determined from two identical cell builds wherein the only difference between the cells, including composition and means of fabrication, is the utilization of the amorphous silicon nanocrystals and the crystalline silicon nanocrystals.

Yet another embodiment is a lithium ion battery that includes a cathode, an anode, and a separator sealed in a battery case with an electrolyte in ionic contact with both the cathode and the anode. Preferably, the anode includes an anode composition affixed to a current collector; where the anode composition includes the aforementioned particulates dispersed in a binder. The lithium-ion battery, preferably, includes a cathode; an anode which includes a plurality of active particles each including a carbon matrix carrying a plurality of amorphous silicon nanoparticles; an electrolyte ionically coupling the anode and the cathode; and a separator electrically separating the anode and the cathode. Preferably, the active particles, individually, include a carbon matrix carrying a plurality of the amorphous silicon nanoparticles; where the amorphous silicon nanoparticles which can include, consist essentially of, or consist of silicon or a silicon alloy.

In some embodiments, a lithium battery includes any of the anodes according to the above-described embodiments. A cathode active material, a conducting agent, a binder, and a solvent may be mixed to prepare a cathode active material composition. The cathode active material composition may be directly coated on a metallic current collector and dried to prepare a cathode plate. In some embodiments, the cathode active material composition may be cast on a separate support to form a cathode active material film, which may then be separated from the support and laminated on a metallic current collector to prepare a cathode plate.

The cathode active material may include at least one selected from the group consisting of lithium cobalt oxide, lithium nickel cobalt manganese oxide, lithium nickel cobalt aluminum oxide, lithium iron phosphorous oxide, and lithium manganese oxide, but is not limited thereto. Any cathode active materials available in the art may be used.

For example, the cathode active material may be a compound represented by one of the following formulae: $Li_a A_{1-b} B^1_b D^1_2$ (where $0.90 \le a \le 1.8$, and $0 \le b \le 0.5$); $Li_a E_{1-b} B^1_b O_{2-c} D^1_c$ (where $0.90 \le a \le 1.8$, $0 \le b \le 0.5$, and $0 \le c \le 0.05$); $LiE_{2-b} B^1_b O_{4-c} D^1_c$ (where $0 \le b \le 0.5$, and $0 \le c \le 0.05$); $Li_a Ni_{1-b-c} Co_b B^1_c D^1_\alpha$ (where $0.90 \le a \le 1.8$, $0 \le b \le 0.05$, $0 \le c \le 0.05$, and $0 < \alpha \le 2$); $Li_a Ni_{1-b-c} Co_b B^1_c O_{2-\alpha} F^1_\alpha$ (where $0.90 \le a \le 1.8$, $0 \le b \le 0.5$, $0 \le c \le 0.05$, and $0 < \alpha < 2$); $Li_a Ni_{1-b-c} O_{2-\alpha} F^1_2$ (where $0.90 \le a \le 1.8$, $0 \le b \le 0.5$, $0 \le c \le 0.05$, and $0 < \alpha < 2$); $Li_a Ni_{1-b-c} Mn_b B^1_c D^1_\alpha$ (where $0.90 \le a \le 1.8$, $0 \le b \le 0.5$, $0 \le c \le 0.05$, and $0 < \alpha \le 2$); $Li_a Ni_{1-b-c} Mn_b B^1_c O_{2-\alpha} F^1_\alpha$ (where $0.90 \le a \le 1.8$, $0 \le b \le 0.5$, $0 \le c \le 0.05$, and $0 < \alpha < 2$); $Li_a Ni_{1-b-c} Mn_b B^1_c O_{2-\alpha} F^1_2$ (where $0.90 \le a \le 1.8$, $0 \le b \le 0.5$, $0 \le c \le 0.05$, and $0 < \alpha < 2$); $Li_a Ni_b E_c G_d O_2$ (where $0.90 \le a \le 1.8$, $0 \le b \le 0.9$, $0 \le c \le 0.5$, and $0.001 \le d \le 0.1$); $Li_a Ni_b Co_c Mn_d GeO_2$ (where $0.90 \le a \le 1.8$, $0 \le b \le 0.9$, $0 \le c \le 0.5$, $0 \le d \le 0.5$, and $0.001 \le e \le 0.1$); $Li_a NiG_b O_2$ (where $0.90 \le a \le 1.8$, $0.001 \le b \le 0.1$); $Li_a CoG_b O_2$ (where $0.90 \le a \le 1.8$, and $0.001 \le b \le 0.1$); $Li_a MnG_b O_2$ (where $0.90 \le a \le 1.8$, and $0.001 \le b \le 0.1$); $Li_a Mn_2 G_b O_4$ (where $0.90 \le a \le 1.8$, and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)} J_2(PO_4)_3$ (where $0 \le f \le 2$); $Li_{(3-f)} Fe_2(PO_4)_3$ (where $0 \le f \le 2$); and $LiFePO_4$.

In the formulae above, A is selected from the group consisting of nickel (Ni), cobalt (Co), manganese (Mn), and combinations thereof; $B^1$ is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; $D^1$ is selected from the group consisting of oxygen (O), fluorine (F), sulfur (S), phosphorus (P), and combinations thereof; E is selected from the group consisting of cobalt (Co), manganese (Mn), and combinations thereof; $F^1$ is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

In some embodiments, compounds listed above as cathode active materials may have a surface coating layer (hereinafter, "coating layer"). Alternatively, a combination of the compound without having a coating layer and the compound having a coating layer, with the compounds being selected from the compounds listed above, may be used. The coating layer may include at least one compound of a coating element selected from the group consisting of oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the cathode active material when a compound of the coating element is used. For example, the coating layer may be formed using a spray coating method, a dipping method, or the like. A detailed description thereof is omitted.

For example, the cathode active material may be $LiNiO_2$, $LiCoO_2$, $LiMn_xO_{2x}$ (x=1, 2), $LiNi_{1-x}Mn_xO_2(0<x<1)$, $LiNi_{1-x-y}CoNn_yO_2$ (where $0 \leq x \leq 0.5$), $LiFeO_2$, $V_2O_5$, TiS, or MoS.

The conducting agent, the binder, and the solvent used for the cathode active material composition may be the same as those used for the anode active material composition. Alternatively, a plasticizer may be further added to the cathode active material composition and/or the anode active material composition to form pores in the electrode plates.

The amount of the cathode electrode active material, the conducting agent, the binder, and the solvent are those levels that are generally used to the manufacture of a lithium battery. At least one of the conducting agent, the binder and the solvent may not be used depending on the use and the structure of the lithium battery.

Next, a separator to be disposed between the cathode and the anode is prepared. The separator may be any separator that is commonly used for lithium batteries. The separator may have low resistance to migration of ions in an electrolyte and have an excellent electrolyte-retaining ability. Examples of the separator include glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

The polymer resin used to manufacture the separator may be any material that is commonly used as a binder for electrode plates. Examples of the polymer resin include but not limited to a vinylidenefluoride/hexafluoropropylene copolymer, polyvinylidene fluoride (PVDF), polyacrylonitrile, polymethylmethacrylate and a mixture thereof.

The electrolyte may be an organic electrolyte solution. Alternately, the electrolyte may be in a solid phase. Non-limiting examples of the electrolyte include lithium oxide and lithium oxynitride. Any material available as a solid electrolyte in the art may be used. The solid electrolyte may be formed on the anode by, for example, sputtering.

In some embodiments, an organic electrolyte solution may be prepared as follows. The organic electrolyte solution may be prepared by dissolving a lithium salt in an organic solvent. The organic solvent may be any solvent available as an organic solvent in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may be any material available as a lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4FgSO_3$, $LiAlO_2$, $LiAlCl_4$, $LiN(C_xF_{2x+1}SO_2)(C_yF_{2y+1}SO_2)$ (where x and y are natural numbers), LiCl, Lil, or a combination) thereof.

Generally, a lithium battery includes a cathode, an anode, and a separator. The cathode, the anode, and the separator can be wound or folded, and then sealed in a battery case. Then, the battery case can be filled with an organic electrolyte solution and sealed, thereby completing the manufacturing process of the lithium battery. The battery case may be a cylindrical type, a rectangular type, or a thin-film type. For example, the lithium battery may be a thin-film type battery. The lithium battery may be a lithium ion battery.

The separator may be disposed between the cathode and the anode to form a battery assembly. In some embodiments, the battery assembly may be stacked in a bi-cell structure and impregnated with the electrolyte solution. The resultant is put into a pouch and hermetically sealed, thereby completing the manufacture of a lithium ion polymer battery.

In some other embodiments, a plurality of battery assemblies may be stacked to form a battery pack, which may be used in any suitable device that operate at high temperatures and require high output, for example, in a laptop computer, a smart phone, an electric vehicle, and the like.

The lithium battery may have increased charge/discharge rate, electric capacity, and lifetime characteristics, and thus may be applicable in an electric vehicle (EV), for example, in a hybrid vehicle such as plug-in hybrid electric vehicle (PHEV).

While the compositions and methods of this invention have been described in terms of preferred embodiments, it will be apparent to those of skill in the art that variations may be applied to the compositions and/or methods in the steps or in the sequence of steps of the method described herein without departing from the concept, spirit and scope of the invention. More specifically, it will be apparent that certain agents that are both chemically and physically related may be substituted for the agents described herein while the same or similar results would be achieved. All such similar substitutes and modifications apparent to those skilled in the art are deemed to be within the spirit, scope and concept of the invention as defined by the appended claims.

What is claimed:

1. A lithium-ion battery comprising:
    a cell that includes a cathode, an anode, and a separator sealed in a battery case with an electrolyte in ionic contact with both the cathode and the anode;
    where the anode includes an anode composition affixed to a current collector;
        where the anode composition includes an anode active particulate dispersed in a binder:
        where the anode active particulate includes a plurality of amorphous silicon nanoparticles affixed to interior surfaces of a porous carbon matrix, the amorphous silicon nanoparticles individually comprising amorphous silicon domains and crystalline silicon domains, where the crystalline silicon domains have an average domain size of less than 20 nm; where the atom ratio of amorphous silicon domains to crystalline silicon domains is in the range of about 1:1 to about 100:1; and wherein the anode active particulate includes an X-ray reflection at 28.5° (2Θ) and Raman absorptions at 521 cm$^{-1}$ and 480 cm$^{-1}$;

where the cell further includes an amorphous first coulombic efficiency (FCE) above 90%.

2. The lithium-ion battery of claim 1, wherein the amorphous FCE is above 92%.

3. The lithium-ion battery of claim 1, wherein the amorphous FCE is above 94%.

4. The lithium ion battery of claim 1, wherein a crystalline FCE of a cell having an analogous anode is less than about 85%;

where the analogous anode includes an analogous anode composition affixed to a current collector;

where the analogous anode composition includes an analogous anode active particulate dispersed in a binder:

where the analogous anode active particulate includes a plurality of crystalline silicon nanoparticles affixed to interior surface of a porous carbon matrix; where the crystalline silicon nanocrystals individually comprise amorphous silicon domains and crystalline silicon domains, and where the atom ratio of amorphous silicon domains to crystalline silicon domains is in the range of about 1:1000 to about 1:5.

5. The lithium-ion battery of claim 4, wherein the crystalline FCE is less than about 80%.

6. The lithium-ion battery of claim 1, wherein the anode active particulate has an average cross section of about 1 to about 25 μm and;

wherein the amorphous silicon nanoparticles have an average diameter of about 50 nm to about 400 nm.

7. The lithium-ion battery of claim 1, wherein the amorphous silicon nanoparticles consist essentially of silicon.

8. The lithium-ion battery of claim 1, wherein the amorphous silicon nanoparticles consist of silicon.

9. The lithium-ion battery of claim 1, wherein the amorphous silicon nanoparticles include amorphous hydrogenated silicon (a-Si:H).

10. The lithium-ion battery of claim 1, wherein the anode active particulate includes a mass ratio of the carbon matrix to the amorphous silicon nanoparticles of about 5:1 to about 1:10.

11. The lithium-ion battery of claim 10, wherein the mass ratio is about 1:1 to about 1:5.

12. The lithium-ion battery of claim 1, wherein the anode active particulate has an average cross section of about 5 to about 15 μm.

13. The lithium-ion battery of claim 1, wherein the anode active particulate includes about 10 wt. % to about 50 wt. % porous carbon matrix and about 90 wt. % to about 50 wt. % amorphous silicon nanoparticles.

* * * * *